United States Patent
Frank (10) Patent No.: US 9,751,002 B2
(45) Date of Patent: Sep. 5, 2017

(54) RANDOM DIGIT GENERATOR FEATURING DIFFERENTLY COLORED BALLS

(71) Applicant: Alan Frank, Pittsburgh, PA (US)

(72) Inventor: Alan Frank, Pittsburgh, PA (US)

(*) Notice: Subject to any disclaimer, the term of this patent is extended or adjusted under 35 U.S.C. 154(b) by 13 days.

(21) Appl. No.: 14/747,340

(22) Filed: Jun. 23, 2015

(65) Prior Publication Data

US 2016/0375352 A1 Dec. 29, 2016

(51) Int. Cl.
| | | |
|---|---|---|
| *A63F 7/00* | (2006.01) | |
| *A63F 7/04* | (2006.01) | |
| *A63F 9/24* | (2006.01) | |
| *G07F 17/32* | (2006.01) | |
| *G07F 17/34* | (2006.01) | |
| *G07C 15/00* | (2006.01) | |
| *G06F 7/58* | (2006.01) | |

(52) U.S. Cl.
CPC ............... *A63F 7/048* (2013.01); *A63F 9/24* (2013.01); *G06F 7/588* (2013.01); *G07C 15/001* (2013.01); *G07F 17/3213* (2013.01); *G07F 17/34* (2013.01); *A63F 2009/2454* (2013.01); *A63F 2009/2458* (2013.01); *A63F 2009/2463* (2013.01)

(58) Field of Classification Search
CPC ............. A63F 3/06; A63F 3/08; A63F 3/0645
See application file for complete search history.

(56) References Cited

U.S. PATENT DOCUMENTS

| | | | | |
|---|---|---|---|---|
| 4,140,220 A * | 2/1979 | Hazeltine | ................... | G01J 3/50 209/580 |
| 5,050,880 A * | 9/1991 | Sloan | ..................... | A63F 7/048 273/144 B |
| 5,088,737 A * | 2/1992 | Frank | ..................... | A63F 7/048 273/139 |
| 5,630,759 A * | 5/1997 | Lee | ......................... | A63D 15/00 473/23 |
| 5,845,903 A * | 12/1998 | Sloan | ..................... | A63F 7/048 273/108 |
| 2002/0094860 A1* | 7/2002 | Itkis | ......................... | G07F 17/32 463/19 |
| 2004/0063491 A1* | 4/2004 | Banyai | .................... | G07F 17/32 463/22 |
| 2006/0046837 A1* | 3/2006 | Ito | ............................ | A63F 5/02 463/22 |

(Continued)

Primary Examiner — James S McClellan
Assistant Examiner — Kevin Carter (57) ABSTRACT

The current invention is an improvement to the random number generator described in U.S. Pat. No. 5,088,737. Random digits are generated by mixing ten differently colored balls in a transparent chamber. The entire surfaces of all the balls are uniformly colored and unmarked. None of the balls contains any electronic identification devices. A color sensor mounted near the settlement pocket of the mixing chamber emits data that is unique for each ball. A miniature computer and novel software correlate the data emitted for each of the ten balls with a different digit. One of the balls is randomly separated from the others and comes to rest near the color sensor without human intervention. The computer and its software record the digit that is correlated with the randomly separated ball and command a mini-projector to display the digit on the ball's surface in an upright position.

4 Claims, 6 Drawing Sheets
(4 of 6 Drawing Sheet(s) Filed in Color)

LEGEND FOR CORRELATING DIGITS AND COLORS (56) References Cited

U.S. PATENT DOCUMENTS

| | | | |
|---|---|---|---|
| 2008/0076510 A1* | 3/2008 | Ito | G07F 17/32 |
| | | | 463/17 |
| 2008/0167110 A1* | 7/2008 | Fisk | A63F 3/0605 |
| | | | 463/17 |
| 2010/0160020 A1* | 6/2010 | Okuaki | G07F 17/3297 |
| | | | 463/17 |
| 2014/0029795 A1* | 1/2014 | Rommer | G07C 15/001 |
| | | | 382/103 |

* cited by examiner

FIG. 1

Isometric Centerline Cutaway View

FIG. 2

Side Schematic View

FIG. 3

Hardware and Software Specifications for SBC

| Items | Details |
|---|---|
| CPU | AllWinner A20 SoC, 1GHz ARM Cortex A7 Dual Core |
| GPU | OpenGL ES2.0, OpenVG 1.1, Mali 400 Dual Core |
| DRAM | 1GB |
| Onboard Storage | 4GB Flash, microSD card (TF) slot for up to 32GB |
| Video Output | HDMI 1.4 with HDCP support |
| OS | <ul><li>Ubuntu 12.04</li><li>Android 4.2</li></ul> |
| Arduino extension interface | Arduino sockets, same as Arduino UNO<br>14xGPIO, 2xPWM, 6xADC, 1xUART, 1xSPI, 1xI2C |
| Network interface | <ul><li>Ethernet 10M/100M/1Gbps</li></ul> |
| Audio out | <ul><li>3.5mm analog audio interface</li></ul> |
| IR | IR receiver |
| SATA | SATA Host socket |
| Camera | MIPI |
| USB | 2 x USB host, 1xUSB OTG |
| Power | 5V, 2000mA |
| Overall Size | 3 5/8 " x 2 1/8" |

Software Specifications

| Items | Description |
|---|---|
| OS | <ul><li>Ubuntu 12.04</li><li>Android 4.2</li></ul> |
| Programming language support | <ul><li>C, C++ with GNU tool chain</li><li>Java with standard Android SDK</li><li>Python</li></ul> |

FIG. 4

LEGEND FOR CORRELATING DIGITS AND COLORS

FIG. 5

Snapshot of sensor data

| YELLOW OBJECT | BLUE OBJECT | RED OBJECT |
|---|---|---|
| R0152 G0091 B0047 | R0054 G0083 B0200 | R0099 G0018 B0028 |
| R0151 G0091 B0047 | R0054 G0083 B0200 | R0098 G0018 B0028 |
| R0151 G0091 B0047 | R0054 G0083 B0200 | R0099 G0018 B0027 |
| R0152 G0090 B0046 | R0054 G0084 B0199 | R0099 G0018 B0027 |
| R0151 G0090 B0047 | R0054 G0084 B0200 | R0099 G0018 B0027 |
| R0152 G0090 B0047 | R0054 G0084 B0199 | R0098 G0018 B0027 |
| R0151 G0090 B0047 | R0054 G0084 B0199 | R0099 G0018 B0027 |
| R0151 G0091 B0047 | R0054 G0083 B0200 | R0099 G0018 B0027 |
| R0152 G0090 B0047 | R0054 G0083 B0200 | R0099 G0018 B0027 |
| R0152 G0091 B0047 | R0054 G0083 B0200 | R0099 G0019 B0027 |

| PURPLE OBJECT | ORANGE OBJECT | GREEN OBJECT |
|---|---|---|
| R0032 G0021 B0081 | R0141 G0127 B0242 | R0051 G0079 B0152 |
| R0032 G0022 B0081 | R0141 G0127 B0243 | R0051 G0078 B0152 |
| R0032 G0021 B0081 | R0141 G0128 B0242 | R0051 G0078 B0152 |
| R0031 G0021 B0081 | R0140 G0128 B0242 | R0051 G0078 B0152 |
| R0032 G0022 B0081 | R0140 G0128 B0243 | R0051 G0078 B0152 |
| R0031 G0021 B0082 | R0141 G0128 B0242 | R0051 G0078 B0153 |
| R0031 G0022 B0081 | R0141 G0128 B0243 | R0051 G0078 B0152 |
| R0032 G0022 B0081 | R0140 G0128 B0242 | R0051 G0078 B0152 |
| R0032 G0022 B0081 | R0141 G0128 B0242 | R0051 G0078 B0152 |
| R0031 G0021 B0081 | R0141 G0128 B0243 | R0051 G0078 B0152 |

FIG. 6

Sensor Specifications

- Detects a full range of colors and outputs data as RGB (Red/Green/Blue) components.
- Detects broad-spectrum ambient light with sensitivity down to 44µW/cm² per lsb.
- Generates 24-bit color using onboard RGB LED.
- Plugs into servo headers (with optional cable) or wireless breadboards.
- Single-pin interface uses a simple serial protocol to define and initiate color detection and generation.
- Color detection and generation details handled by onboard microcontroller.
- Onboard EEPROM for saving custom color detection and generation programs.
- Autorun feature permits running a pre-designated EEPROM program with only a power supply.

US 9,751,002 B2

RANDOM DIGIT GENERATOR FEATURING DIFFERENTLY COLORED BALLS

BACKGROUND

This invention relates generally random lottery number generating.

Random number generators that use balls with numbers marked on their surfaces constitute the state of the art of daily state lottery. They enjoy the highest level of credibility among random number generators. All components of the entire process are constantly visible. These lotteries are commonly known as "live draw" lotteries.

To generate a lottery ball randomly and to identify the numbers on its surface, human hands and eyes are required in most lotteries.

No "live draw" automatic random lottery number generating system is known to exist which features fully visible random generation and identification of different numbers without requiring human eyesight, assistance or intervention, and without implanting radio frequency identification (RFID) chips inside the balls.

In U.S. Pat. No. 5,088,737, the numbers of the balls were automatically identified by three narrow strips of bar codes on three intersecting circumferences of their surfaces. The randomly selected ball rotated upon a bar code reader. Human eyes were not required for identifying the numbers of the balls. However, the non-uniformity of the surfaces of the balls made it necessary to employ multiple bar code readers and to rotate the selected ball. Said procedures proved to be too cumbersome, and rendered the device unfeasible.

Another attempt to automate "live draw" random number generation was described in U.S. Pat. No. 8,128,089 B2, wherein human eyes were not needed to identify the balls. The balls contained integrated circuit (IC) chips which transmitted information about the balls' numbers to a computer using wireless radio frequency identification (RFID) technology. Said technology is not used to identify ball numbers by most state lotteries and casinos because of their vulnerability to tampering and cheating.

A need therefore still exists for a credible, feasible, "live draw" system that automatically and randomly separates a ball from a group of similar balls being-mixed in a transparent chamber and identifies the separated ball without human intervention, or RFID technology.

The present invention satisfies said need and overcomes the above shortcomings by mixing a set of ten balls in a transparent chamber. The surface color of each ball is different from the surface colors of the other nine balls. The colors of all of said surfaces are uniform. There are no markings of any type on the balls' surfaces. There are no chips or IC tags beneath the balls' surfaces.

After mixing the ten balls for a random time period, one ball randomly and automatically separates itself from the others and comes to rest near a color sensor. The sensor emits different data for each of the ten colors. A miniature computer and novel software use the data produced by the sensor to correlate a different digit with each of the ten differently colored surfaces. A projector displays the digit corresponding to the surface color of the randomly separated ball onto the surface of the randomly separated ball in an upright position as shown in the legend.

A legend consisting of ten differently colored circles with a different digit printed inside each circle in a contrasting color and in an upright position enables viewers to visually track ball movement far easier than if the balls were white with black numbers printed sideways and upside down.

One objective of the current invention is to provide lottery playing enthusiasts with an opportunity to enjoy instant, automatic "live draw" lottery.

Another objective of the current invention is to provide "live draw" free play, automatic instant lottery machines as customer traffic generators for retail businesses. Customers can satisfy their lottery playing appetites instantly by visiting a retail establishment that will discount their purchases if the last two digits on their receipts become matched a randomly generated number.

Another objective of the current invention is to enable businesses to promote sales by awarding prizes to customers whose receipts contain numbers that match random numbers generated at a central location.

SUMMARY OF THE INVENTION

A preferred embodiment of the current invention includes a plurality of transparent mixing chambers, each of which contains ten balls of substantially identical size, shape and weight, but differing surface colors. The entire surface of each ball has a uniform color. There are no markings of any kind on any of the balls' surfaces.

A legend to enable viewers to correlate each ball's color with its corresponding digit is printed on the front of the mixing chamber. The legend consists of circular swatches of the colors of the balls with their corresponding digits superimposed centrally and upright.

An upward stream of air is supplied into the bottom of the mixing chamber causing the balls to mix for a short and random period of time, after which, one of the balls randomly and automatically falls into the selection pocket and comes to rest against the cylindrical light shield of the color sensor which is mounted adjacent to the selection pocket.

The sensor beams rapid alternating pulses of red, green and blue light onto the ball's surface and measures the amount of each pulse of light that is reflected back onto the sensor's photodiode cell. The sensor transmits different alphanumeric output data for each color to a miniature single board computer (SBC) which hosts software that includes images of all the ten digits and causes each color to become correlated with a different digit. The software directs a mini-projector to display an image of the digit that corresponds to the randomly selected ball on the ball's surface in an upright position.

AMENDED BRIEF DESCRIPTION OF THE DRAWINGS

The patent application file contains at least one drawing executed in color. Copies of this patent or patent application publication with color drawings will be provided by the Office upon request and payment of the necessary fee. As the color drawings are being filed electronically via EFS-Web, only one set of the drawings is being submitted.

DETAILED DESCRIPTION OF THE INVENTION

Figure 1:
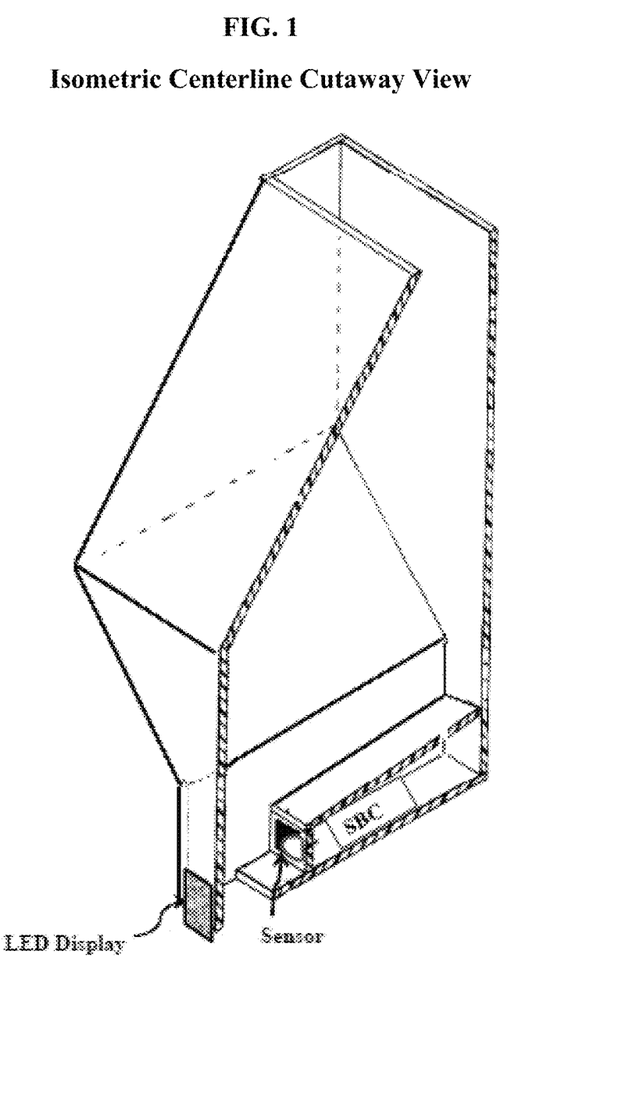
FIG. 1 is an isometric centerline cutaway view of an empty mixing chamber showing the positions of the SBC, sensor and LED display.
Figure 2:
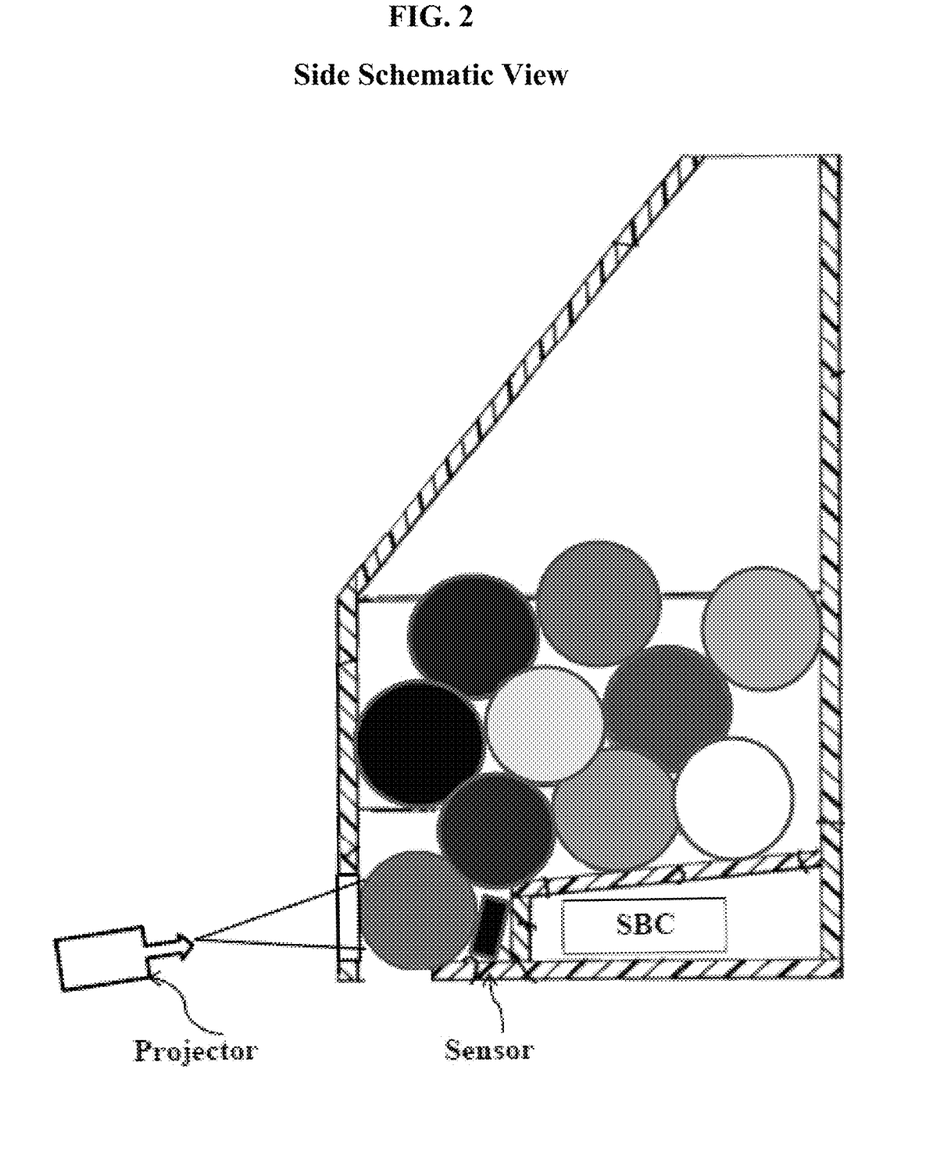
FIG. 2 is a side schematic view of the mixing chamber and projector with ten differently colored balls at rest, showing the projector, sensor and SBC used in the current invention.
Figure 4:
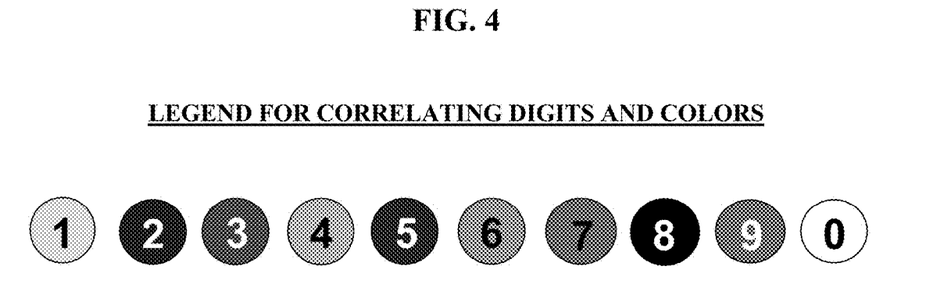
FIG. 4 displays a color-digit legend for correlating digits and colors

In all embodiments of the invention, mixing chambers similar to the one shown in Drawings 1 and 2, and described in U.S. Pat. No. 4,601,471 and in U.S. Pat. No. 5,088,737 are used, with several modifications. The SBC and sensor are mounted to the chamber in the positions shown in FIG. 1. They may be mounted in other locations. A "color-to-digit" legend shown in Drawing 4 is printed on the front of the mixing chamber.

Each mixing chamber contains ten mixable spherical balls having similar, sizes and weights. No RFID devices are contained inside of the balls.

The mixing process ends after a random period of time, the length of which depends upon the data produced during previous mixing cycles. One ball falls into the selection pocket without human intervention and settles against the color sensor. The sensor begins transmitting data to the SBC. The SBC software processes the data and causes the digit that corresponds to the color of the randomly selected ball to be displayed by a projector directly onto the surface of the ball in an upright position for easy viewing.

Another embodiment of the invention is specifically designed for use in free-play instant lottery machines that can be used to attract retail traffic. Two chambers of the type shown in Drawings 1 and 2 are used. Each chamber contains ten differently colored balls.

After purchasing goods, a customer slides his or her receipt into a slot, touches a start button to mix the balls, and receives a refund of all, or of a percentage of his or her total of the receipt if the last two digits of the receipt are matched by the randomly generated two-digit number. A match will occur once every 100 plays. The free play embodiment can also be used to promote business with remotely situated purchasers whose receipts match lottery numbers that are generated at a central location.

Figure 3:
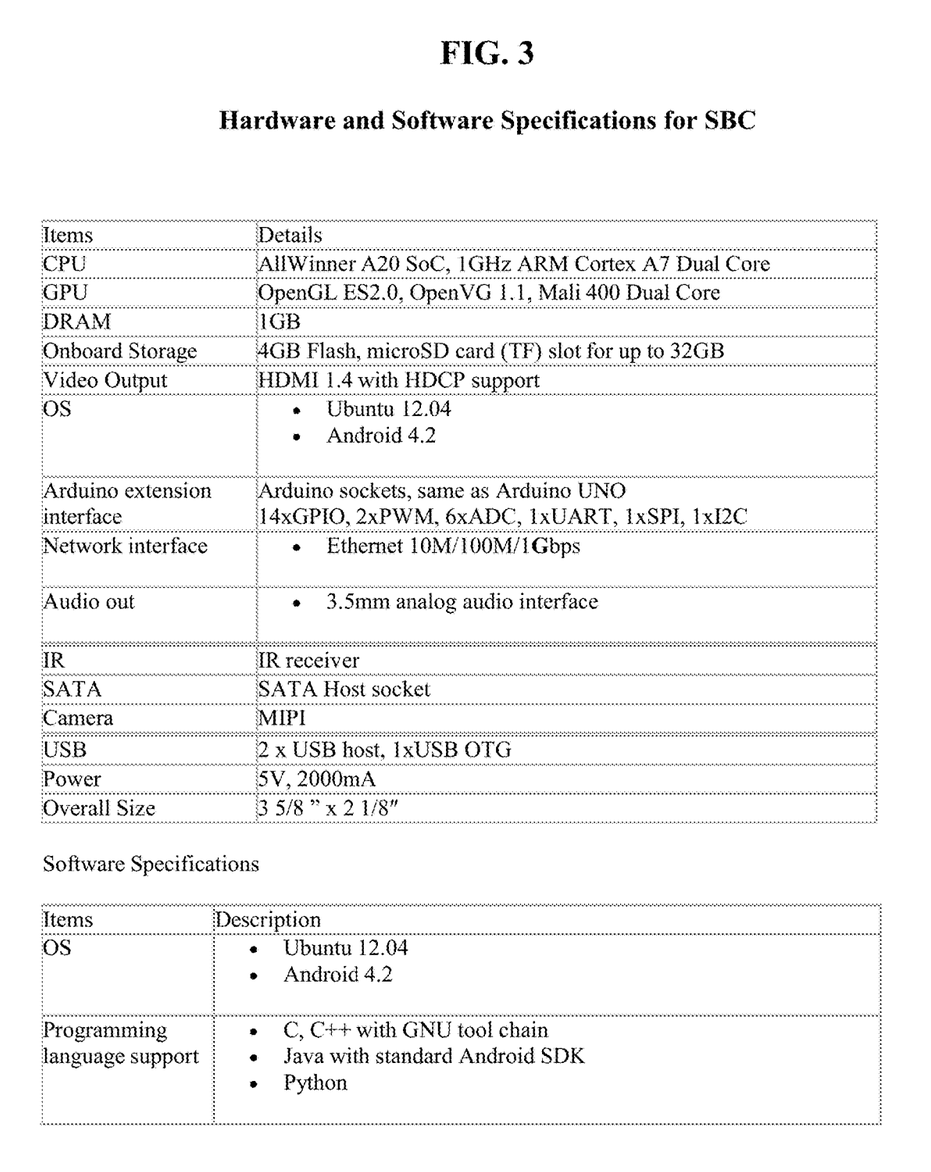
FIG. 3 contains the specifications for the SBC.

The electronic components of the current invention are readily available commercially and inexpensively. A miniature SBC is used for each mixing chamber in all of the embodiments of the current invention. The SBC comprises a small printed circuit board to which are mounted a microprocessor, ports for HDMI, USB, audio, and power and a development environment of electronic components for storing and processing software. FIG. 3 contains its specifications. Other similar development boards, microcontrollers and microcontroller platforms are suitable if they have USB, HDMI, and Audio ports.

The software includes images of the ten digits as shown in Drawing 4.

The color sensor is a light-to-voltage converter. A sensor is mounted in or near the settlement pocket of each mixing chamber in all of the embodiments of the current invention. It contains tiny red, green and blue light emitting diodes and a tiny light receiving photodiode. Each light emitting diode emits a pulse of light every ten milliseconds onto the surface of the randomly selected ball. The light pulses are reflected from the ball's surface onto the sensor's light receiving photodiode. It responds to light in the range of 320 nm to 10650 nm. Its output voltage is proportional to reflected light intensity.

Figure 6:
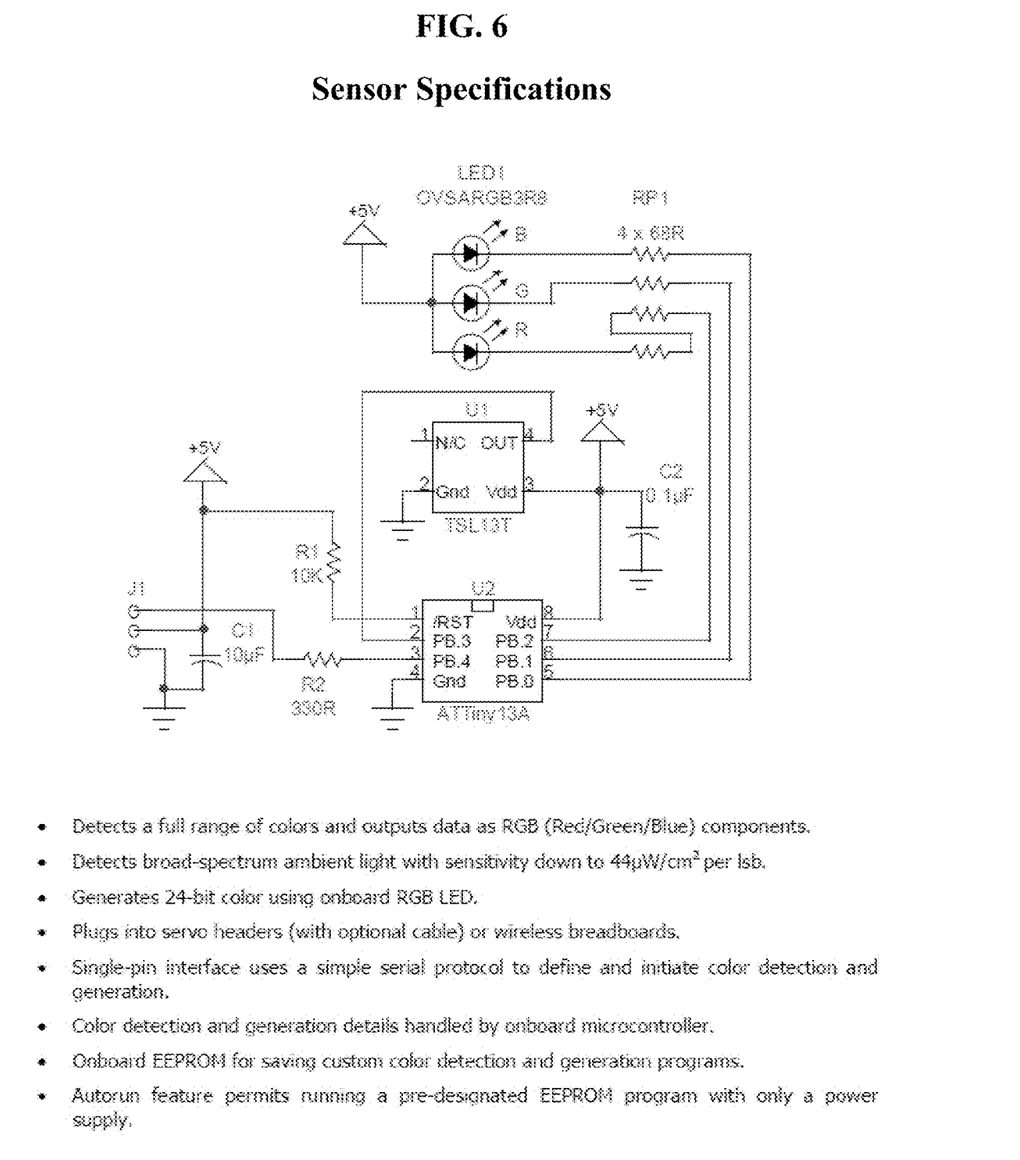
FIG. 6 displays a circuit diagram and specifications for the sensor.

A cylindrical ambient light shield is mounted on the sensor board and surrounds the light emitting diodes and the light receiving photodiode. The shield's diameter is smaller than the diameter of the balls. The "signal" pin of the sensor is connected to any one of the numbered ports of the SBC. The SBC software receives the sensor's output data from a specific port that is designated by the software. The "3.5v" pin of the sensor is connected to the "3.5v" port of the SBC. The "ground" pin of the sensor is connected to the "ground" port of the SBC. Its wiring diagram and specifications are shown in Drawing 8.

Before placing a sensor or the balls in service, they are calibrated in the workshop. Each ball is placed on the sensor's light shield in the same manner that a randomly selected ball will come to rest against the light shield during "live draw" operation of the system. The amount of each pulse of red, green and blue light reflected onto the sensor's photodiode cell from each ball is different from the amount reflected by other balls. For example, a red ball causes the sensor to emit an amount of "red" voltage which is different from the amount of "red" voltage that is reflected from a green or blue ball. A ball is unsuitable for use if all three of its red-green-blue components of data are similar to all three components reflected by any of the other balls.

Figure 5:
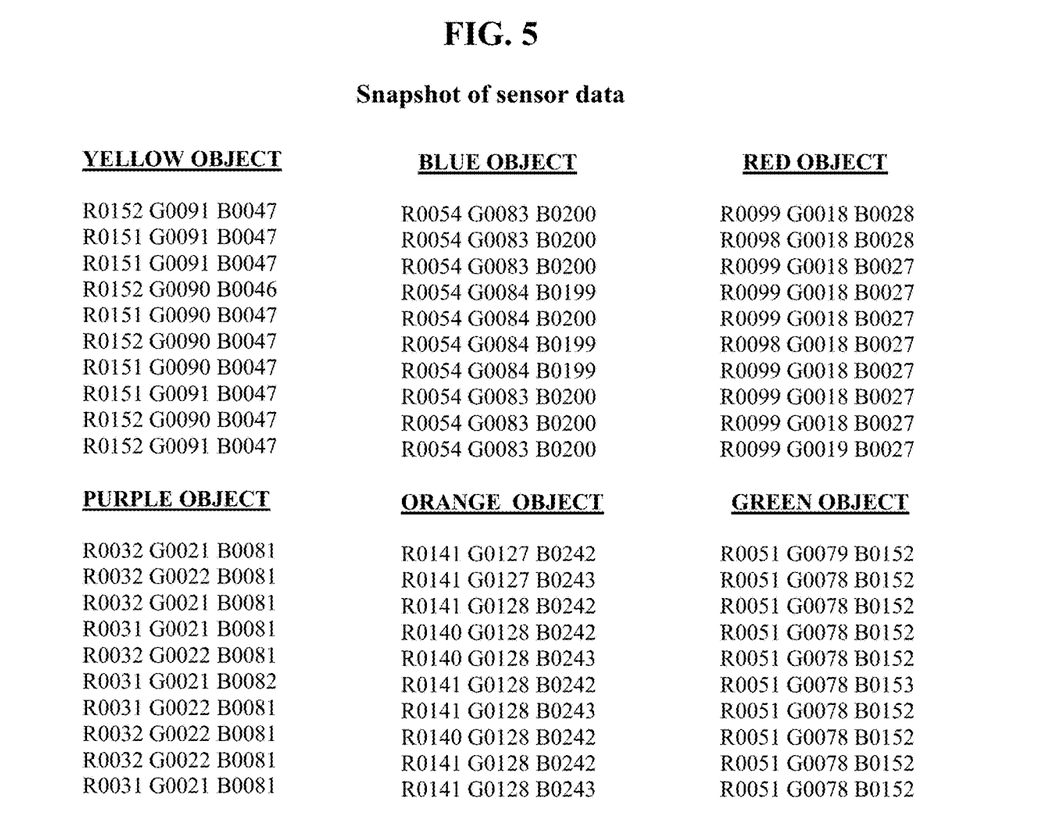
FIG. 5 is a sample of the actual data emitted by the sensor for six different balls.

Every ten milliseconds, the sensor emits a five-character string of alphanumeric data for each pulse of red, green and blue light reflected from each ball. FIG. 5 displays a snapshot of typical data. The leading alpha characters R, G, and B of the data pulses represent red, green and blue. The four numeric characters of the data pulses represent voltage. The software and data enable each ball to become correlated with a corresponding indicium, depending upon the ball's color.

The software template, as modified to include the calibration data, is uploaded to the SBC. When one of the balls comes to rest against the sensor, its corresponding digit is displayed and announced immediately.

The software for the preferred embodiment of the current invention is written in C++ on a personal computer and uploaded to the SBC. The code contains a different "if" statement for each different color. The "if" statements anticipate upward and downward variations as the balls age and get dirty.

With reference to FIG. 5, the data transmitted by the sensor when a yellow ball was placed on the light shield varied between R0151 and R0152, and between G0090 and G0091, and between B0046 and B0047. The "if" statement for color yellow reads: "If (red>140 && red<170 && grn>80 && grn<112 && blu>30 && blu<60), display (yellow)"

In common English language, the above statement means:
"If the reflected red light pulses produce numbers greater than R0140 and less than R0170, and also, if the reflected green light pulses produce numbers within the next ten milliseconds greater than G0080 and less than G0112, and also if the reflected blue light pulses produce numbers within the next ten milliseconds greater than B0030 and less than B0060, display (yellow)".

Various devices are suitable for displaying digits. In the preferred embodiment, a small audio-visual projector with a native resolution of 480×320 pixels and brightness of 100 lux and a minimum projection distance of 125 cm and throw distance of 1.25-4.0 m is mounted so that its output lens is about 25 cm from the settlement pocket of a mixing chamber. A 5.00 diopter lens is superimposed over the output lens of the projector to reduce said minimum distance. The projector and SBC are connected by their HDMI ports.

In an alternate embodiment, when one of the randomly selected balls settles near the sensor, the projector beams an image of the digit corresponding to the randomly selected ball onto a screen situated near the settlement pocket.

In an alternate embodiment, a laser projector beams an image of the digit corresponding to the color of the randomly selected ball onto the surface of the selected ball or onto a nearby small screen.

In another alternate embodiment, a circular liquid crystal display (LCD) displays an image of the digit corresponding to the color of the randomly selected ball.

RELEVANT LITERATURE

The following patents are relevant to the current invention.

| | |
|---|---|
| U.S. Pat. No. 8,128,089 B2 | Automated bingo game based on RFID-tagged balls |

| | |
|---|---|
| U.S. Pat. No. 4,786,056 A | Random number generator |
| U.S. Pat. No. 5,419,557 A | Lottery ball mixing and selecting apparatus |
| U.S. Pat. No. 4,403,775 | Random indicia selector |
| U.S. Pat. No. 4,601,471 | Random number generator |
| U.S. Pat. No. 5,088,737 | Player operable lottery machine with system for automatically identifying spheres |
| U.S. Pat. No. 6,840,855 | Apparatus for and method of playing games of chance |
| U.S. Pat. No. 4,786,056 | Random number generator with marked balls |

U.S. patent application Ser. No. 20,110,254,224 Al, Gaming apparatus comprising balls.

U.S. patent application Ser. No. 20,020,111,208 Al, Gaming apparatus for playing dice.

I claim:

1. A system for randomly generating at least one lottery object indicia, comprising:
    a transparent chamber;
    a plurality of lottery objects having a substantially spherical shape, similar size, different colors, and no markings on the surface of the lottery objects, the plurality of lottery objects are positioned inside the transparent chamber,
    means for mixing the plurality of lottery objects within the transparent chamber,
    a selection pocket located within the transparent chamber for receiving a selected lottery object that was separated from all other lottery objects in the transparent chamber;
    a color sensor for sensing color data of the selected lottery object, wherein the color sensor includes an ambient light shield having a circular opening with a diameter smaller than the diameter of the selected lottery object, the color sensor is located proximate the selection pocket, and the selected lottery object resting against the ambient light shield when the selected lottery object is positioned in the selection pocket;
    a computer for receiving the color data of the selected lottery object transmitted from the color sensor, wherein the computer associates the color data of the selected lottery object with a selected lottery object indicia; and
    a means for displaying an image of the selected lottery object indicia.

2. The system for randomly generating at least one lottery object indicia of claim 1, wherein the means for displaying is a projector for projecting the image of the selected object indicia on the selected lottery object.

3. A system for randomly generating at least one lottery object indicia, comprising:
    a transparent chamber;
    a plurality of lottery objects having a substantially spherical shape, similar size, different colors, and no markings on the surface of the lottery objects, the plurality of lottery objects are positioned inside the transparent chamber,
    means for mixing the plurality of lottery objects within the transparent chamber,
    a selection pocket located within the transparent chamber for receiving a selected lottery object that was separated from all other lottery objects in the transparent chamber;
    a color sensor located proximate the selection pocket for sensing color data of the selected lottery object;
    a computer for receiving the color data of the selected lottery object transmitted from the color sensor, wherein the computer associates the color data of the selected lottery object with a selected lottery object indicia; and
    a projector for projecting an image of the selected object indicia on the selected lottery object.

4. The system for randomly generating at least one lottery object indicia of claim 3, wherein the color sensor includes an ambient light shield having a circular opening with a diameter smaller than the diameter of the selected lottery object and the color sensor is located proximate the selection pocket and the selected lottery object resting against the ambient light shield when the selected lottery object is positioned in the selection pocket.

* * * * *